July 26, 1960 B. W. KING 2,946,131
DEVICE FOR MEASURING INCLINATIONS
Filed Feb. 6, 1956 2 Sheets-Sheet 1
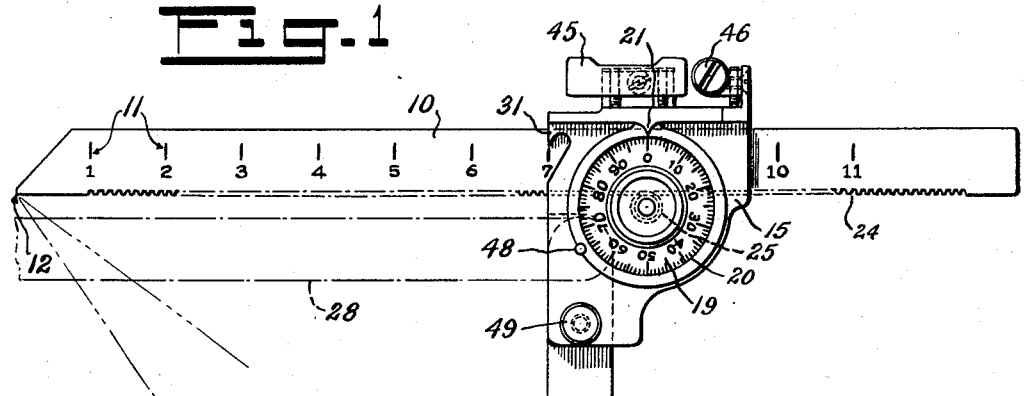
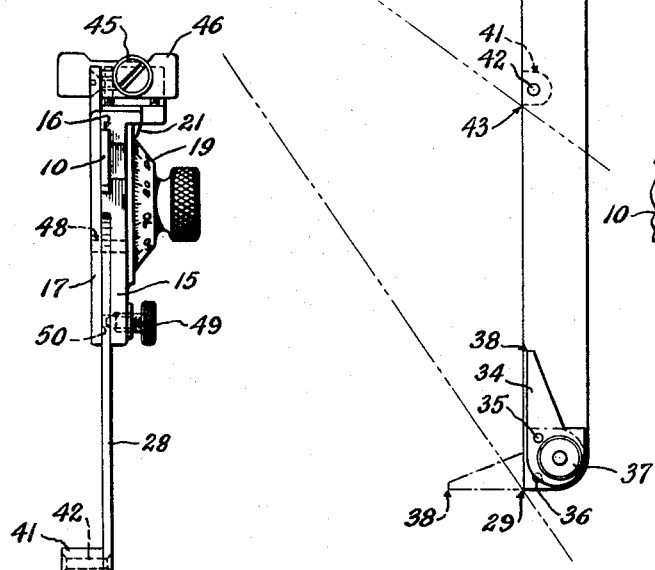
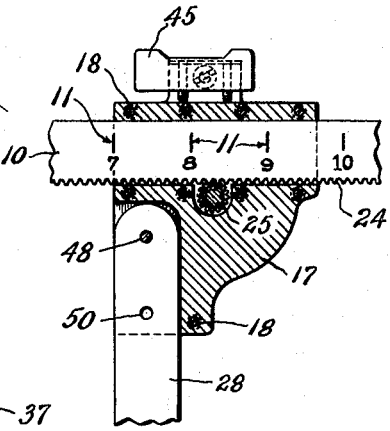
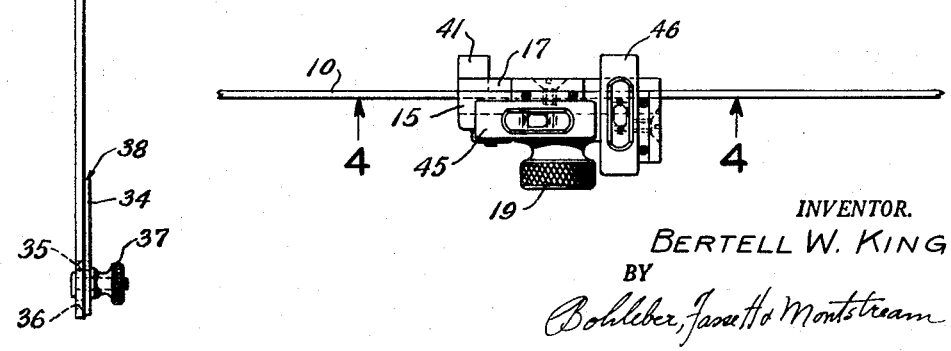
INVENTOR.
BERTELL W. KING
BY
ATTORNEYS July 26, 1960     B. W. KING     2,946,131
DEVICE FOR MEASURING INCLINATIONS
Filed Feb. 6, 1956     2 Sheets-Sheet 2
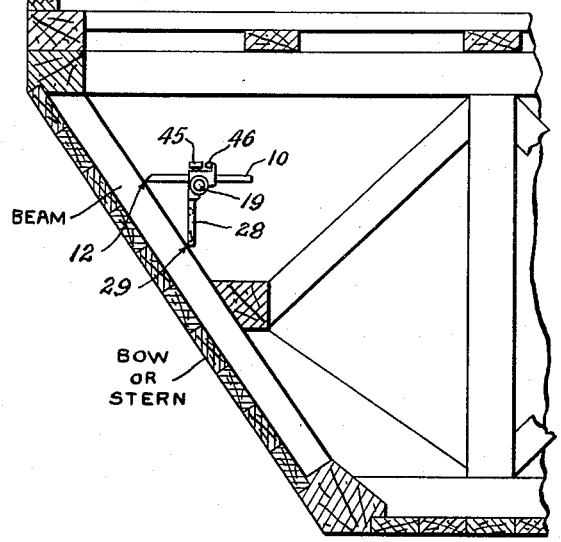
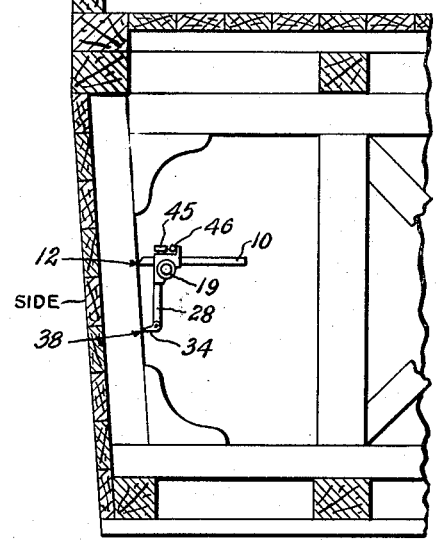
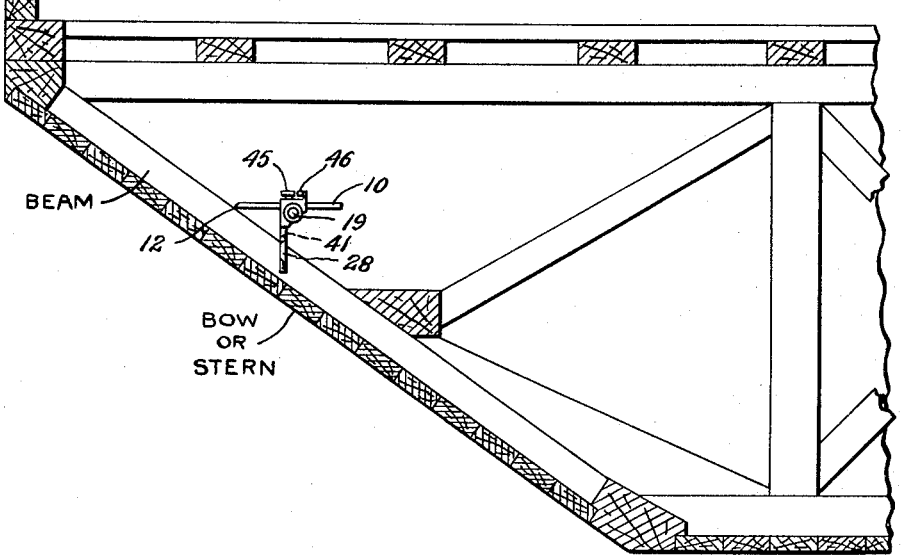
INVENTOR.
BERTELL W. KING
BY
Bohleber, Jaxett & Montstream
ATTORNEYS United States Patent Office 2,946,131
Patented July 26, 1960

2,946,131

DEVICE FOR MEASURING INCLINATIONS

Bertell W. King, Brooklyn, N.Y.
(17 Battery Place, New York, N.Y.)

Filed Feb. 6, 1956, Ser. No. 563,721

6 Claims. (Cl. 33—214)

The invention relates to a device which measures the inclination of a wall or surface from the vertical in relative units such as in tens and thousandths per foot or it may use the metric system. The device is designed primarily for determining the weight of material loaded on a barge or scow although it has general applicability. The displacement of water by the barge caused by the load will give the weight of the load. In order to make the calculation, it is necessary to know the unloaded fore and aft dimension and beam dimension of the barge. The depth of displacement of the barge when loaded at various points around the barge is then measured to give an average depth. The displacement of the barge when loaded can be calculated from the unloaded barge dimensions at the water line and adding thereto the inches per foot of inclination of the prow, stern and sides of the barge for half of the average depth displacement. Barges are built with fore and aft rake or incline in the hull and sometimes the sides are inclined as well. By measuring this inclination when the barge is loaded then the mean length and width dimensions of the barge may be calculated to give a mean area which when multiplied by the depth of average loaded displacement of the barge, the weight of water displacement caused by the load can be calculated which is the same as the weight of the load.

It is an object of the invention to construct a device for measuring inclinations of walls and the like with accuracy.

It is another object of the invention to construct a device which measures the inclination of a wall which is simple to use.

Another object is to construct a device for measuring an inclination having means attached thereto for accurate determination of inclination in the event the inclination is small and irregularities in the wall prevent usual use of the device.

Another object of the invention is to construct a device for measuring both small and large inclination in one device in the event the inclination is of substantial amount.

A still further object is to construct a device for measuring an inclination from the vertical which device can be folded into a more compact size.

Other objects of the invention will be more apparent from the following description when taken in connection with the accompanying drawings illustrating a preferred embodiment of the invention in which:

Figure 1 is a plan view of the device;
Figure 2 is a side view of the device;
Figure 3 is a top view of the device;
Figure 4 is a partial view with the frame plate removed;
Figure 5 shows a manner of using the device on the bow or stern of a barge having an angularity of about 45° or a little greater;
Figure 6 shows use of the device where the inclination is small as in the side of a barge; and
Figure 7 illustrates the use of the device where the inclination of the bow or stern is substantially in excess of 45°.

The device or inclinometer includes a horizontal bar 10 having spaced graduations 11 thereon numbered consecutively. One end of the horizontal bar has a contact portion 12 for engagement of a surface, the inclination of which is to be determined. The contacting portion is preferably an edge so that there will be no interference with engagement of the surface. The contact portion particularly shown is an edge formed by the junction of the lower edge surface of the horizontal bar and the end surface thereof. The graduation numbered 1 is spaced a tenth of a unit distance from the contact edge 12 and each graduation is equally spaced from its adjacent one. For an inclinometer which measures the number of tenths of feet per foot, the spacing between the indicia is one-tenth of a foot. For the metric system the indicia may be in tenths of a meter or tenths of a decimeter.

A frame 15 is slidably mounted on the horizontal bar in any suitable manner. In the construction particularly shown, the frame carries a guide way 16 and a plate 17 is secured over the guide way and frame by screws 18 to movably retain the frame on the horizontal bar. On the frame is rotatably mounted a dial member 19 which has dial graduations 20 of one hundred divisions circularly disposed around the dial and indicia therefor. Obviously fifty divisions may be used with midpoints between divisions supplying the equivalent of one hundred divisions or if less accuracy should be suitable 10 divisions may be provided. The frame carries a suitable pointer 21 adjacent to the dial graduations or divisions.

Suitable means is provided to operatively connect the dial member to the horizontal bar so that one revolution of the dial will move the horizontal bar in the frame one graduation or one-tenth of a foot. The means particularly shown is a toothed rack 24 carried by the horizontal bar and shown particularly on the lower edge thereof. The dial member carries a pinion 25 which meshes with the teeth of the rack 24. If the rack has, for example, sixteen teeth per one-tenth of a foot and with the same number of teeth in the pinion, then one revolution of the dial member will move the horizontal bar one-tenth of a foot in the frame or the distance between two graduations 11. With one hundred graduations or divisions on the dial each division thereon will represent movement of the horizontal bar of $\frac{1}{1000}$ of the unit distance or length i.e. one foot.

The frame carries a vertical bar 28 having a contact surface or corner edge 29 which is shown particularly as being a lower corner or edge formed by the junction of the side edge surface and bottom edge surface of the bar. This bar extends at right angles to the horizontal bar 10 so that a right triangle is formed by the edges of the two bars and a line between the contact edges 12 and 29. The contact edge 29 is a unit distance from a projection of the contact edge 12 onto the vertical bar 28. Since the contact edge 12 on the horizontal bar is at the lower edge of this bar, this edge of the bar is, therefore, a projection from the contact edge 12 to the vertical bar 28. The distance from the junction of the left hand edge of the vertical bar 28 and the lower horizontal edge of the horizontal bar to the contact edge 29 is a unit distance, that is, one foot for the English system. Since the contact edge 29 is at the left-hand edge of the vertical bar 28, this edge may serve as an aligning edge for indicating the measurement or length of the horizontal portion of the horizontal bar from its contact edge 12 with respect to the graduations thereon. For easier reading, however, the frame may carry a pointer 31 which is in alignment with the vertical edge 30 of the vertical bar.

For relatively small angles of inclination, the unevenness in the plates or planking of a scow may interfere with the edge 29 contacting with the side of the planking or timber. It is for this reason that an arm 34 is carried at the lower end of the vertical bar and mounted so that it can be moved to and from an unobstructed position to a lateral or operative position as shown in dot-dash lines. Preferably, the unused position is in alignment with the vertical bar as shown. Any suitable means is provided for retaining the arm in extended position. The means particularly shown includes a pin 35 carried by the arm which fits into a hole 36 in the vertical bar in the extended position. A similar hole is provided in the arm for the position illustrated. A screw and nut means 37 retains the pin in the hole and clamps the arm in laterally extending position. The contact edge 38 on the arm when in extended position is spaced a tenths division from the contact edge 29 corresponding with the spacing between adjacent indicia 11 carried by the horizontal bar. For small inclinations, therefore, and with the arm laterally extended, any roughness or unevenness in the beam or planking of a barge or scow is avoided or bridged. When the arm is used, the reading of the numeral or indicia on the horizontal bar is reduced by one. In other words, if the frame is at the graduation numbered 2 then the correct inclination reading is 2 minus 1, or one-tenth of a foot per foot. The arm may be pivoted so that when in retracted position the contact edge is spaced from the edge of the vertical bar.

The inclinometer is capable of measuring the inclination in units of a foot irrespective of the angle of incline provided the horizontal bar 10 is long enough. The horizontal bar particularly illustrated has eleven tenths of a foot graduations in which the indicia number 10 represents one foot from the contact edge 12 of the horizontal bar. The device, therefore, has a capacity a little in excess of 45° and by lengthening the bar and adding a few more tenths spaced graduations on the horizontal bar, it can conveniently be used for angles well in excess of 45°. For large inclinations, however, the horizontal bar can become unduly long. For substantial inclination it is more convenient to use a shorter dimension on the vertical bar. To this end, the vertical bar carries a projection 41 secured to the bar in any suitable manner such as by a screw 42. This projection has a contact edge 43 which edge is midway between the contact edge 29 and the projection of the contact edge 12 on the frame or vertical bar, that is, as particularly constructed with the lower edge of the horizontal bar. For larger inclinations as shown in Figure 7, a timber or beam of the bow of the scow is engaged by the contact edge 43 of the projection and the horizontal bar extended so that the contact edge 12 engages the surface of the timber or beam. When the projection is used as a contact point then the numeral of the indicia on the horizontal bar is multiplied by two to give a correct inclination in tenths of a foot for each foot of elevation. In other words, if the pointer 31 is between the indicia 5 and 6 of the horizontal indicia then the proper reading is 10 or an inclination of over one foot per foot of elevation.

In using the device or inclinometer, the edge 29, 38 or 43 is used in contact with a timber or side within the barge as described above and as illustrated in Figures 5 through 7. The dial is then turned to extend the horizontal bar so that its contact edge 12 engages the timber or surface of the side. The horizontal bar is extended to a position where the level 45 carried on the frame shows level position for the horizontal bar. Preferably, a second level 46 is provided to assure accurate vertical positioning of the inclinometer to the side or laterally. The axes of the levels are horizontal and the axis of one level is at right angles to the other. Figure 5 illustrates the use of the device or inclinometer for angles of inclination up to about 60°. Figure 7 illustrates the device using the midpoint contact edge for large inclinations. Figure 6 shows the use of the arm 34 for small inclinations.

The device described would be awkward to carry and put in a case or box with the vertical arm projecting at right angles to the horizontal bar. It is for this reason that the vertical bar is carried on a pivot 48 carried by the frame and a clamping screw 49 is provided on the frame for clamping the bar in vertical position. When the instrument is not in use the clamping screw 49 is unloosened and the vertical bar is pivoted to the position shown in dot-dash lines where it is parallel or adjacent to the horizontal bar 10. For more accurate locating of the vertical bar at right angles to the horizontal bar and also for more secure anchorage in horizontal position, a hole 50 may be provided in the vertical bar into which the end of the clamping screw 49 fits.

Knowing the unloaded length and the unloaded width or beam of the barge and adding to each of these dimensions the measured inclination of each of two sides for half the average increased depth because of the load, gives the mean dimensions of the barge or the dimensions of a mid-area. The product of the mean length and mean beam gives a beam area which multiplied by the average increase in depth caused by the load will give the cubic foot displacement of the barge brought about by the load. Multiplying the cubic foot displacement by the weight of a cubic foot of the water displaced will give the weight of the load.

This invention is presented to fill a need for improvements in a Device for Measuring Inclinations. It is understood that various modifications in structure, as well as changes in mode of operation, assembly, and manner of use, may and do often occur to those skilled in the art, especially after benefitting from the teachings of an invention. Hence, it will be understood that this disclosure is illustrative of preferred means of embodying the invention in useful form by explaining the construction, operation and advantages thereof.

What is claimed is:

1. A device for measuring inclinations comprising a horizontal bar having a contact edge at one end thereof, equally spaced tenths graduations carried by the horizontal bar, ten such spaced graduations being a unit length, a frame slidably mounting the horizontal bar, a dial member rotatably mounted on the frame, connecting means carried by the horizontal bar and the dial member connecting the same together for movement of the horizontal bar in the frame and rotation of the dial member, the connecting means moving the horizontal bar the distance between successive graduations on the horizontal bar for one revolution of the dial member, dial graduations of 100 equally spaced divisions circularly disposed on the dial member, a pointer carried by the frame adjacent to the dial divisions, a vertical bar carried at one end by the frame and extending at right angles to the horizontal bar, a contact edge at the remote end of the vertical bar from the frame, and the contact edge of the vertical bar being of unit length distance from a projection from the contact edge of the horizontal bar to a line in alignment with the edge of the vertical bar, a first and a second level carried by the frame each having an axis, the axis of the first level being parallel with the horizontal bar, the axis of the second level being at right angles to the axis of the first level and at right angles to the vertical bar, an arm mounted upon the end of the vertical bar spaced from the frame for positioning the same to and from a position projecting laterally from the vertical bar, the arm having a contact edge when projecting laterally a distance equal to the spacing between two adjacent graduations on the horizontal bar from the contact edge at the remote end of the vertical bar and in horizontal alignment therewith, and means to retain the arm in projected position.

2. A device as in claim 1 including a pivot for the arm pivotally mounting the same on the vertical bar at a point to swing the same spaced from the vertical edge of the bar.

3. A device for measuring inclinations comprising a horizontal bar having a contact edge at one end thereof, equally spaced tenths graduations carried by the horizontal bar, ten such spaced graduations being a unit length, a frame slidably mounting the horizontal bar, a dial member rotatably mounted on the frame, connecting means carried by the horizontal bar and the dial member connecting the same together for movement of the horizontal bar in the frame and rotation of the dial member, the connecting means moving the horizontal bar the distance between successive graduations on the horizontal bar for one revolution of the dial member, dial graduations of 100 equally spaced divisions circularly disposed on the dial member, a pointer carried by the frame adjacent to the dial divisions, a vertical bar carried at one end by the frame and extending at right angles to the horizontal bar, a contact edge at the remote end of the vertical bar from the frame, and the contact edge of the vertical bar being of unit length distance from a projection from the contact edge of the horizontal bar to a line in alignment with the edge of the vertical bar, a first and a second level carried by the frame each having an axis, the axis of the first level being parallel with the horizontal bar, the axis of the second level being at right angles to the axis of the first level and at right angles to the vertical bar, means secured to the vertical bar having a contact edge fixed permanently half of a unit distance from the contact edge at the remote end of the vertical bar.

4. A device for measuring inclinations as in claim 3 including an arm mounted upon the end of the vertical bar spaced from the frame for positioning the same to and from a position projecting laterally from the vertical bar, the arm having a contact edge a distance equal to the spacing between two adjacent graduations on the horizontal bar from the contact edge at the remote end of the vertical bar when projecting laterally and in horizontal alignment therewith, and means to retain the arm in projected position.

5. A device for measuring inclinations comprising a horizontal bar having a contact edge at one end thereof, equally spaced tenths graduations carried by the horizontal bar, ten such spaced graduations being a unit length, a frame slidably mounting the horizontal bar, a dial member rotatably mounted on the frame, connecting means carried by the horizontal bar and the dial member connecting the same together for movement of the horizontal bar in the frame and rotation of the dial member, the connecting means moving the horizontal bar the distance between successive graduations on the horizontal bar for one revolution of the dial member, dial graduations of 100 equally spaced divisions circularly disposed on the dial member, a pointer carried by the frame adjacent to the dial divisions, a vertical bar carried at one end by the frame and extending at right angles to the horizontal bar, a contact edge at the remote end of the vertical bar from the frame, and the contact edge of the vertical bar being of unit length distance from a projection from the contact edge of the horizontal bar to a line in alignment with the edge of the vertical bar, a first and a second level carried by the frame each having an axis, the axis of the first level being parallel with the horizontal bar, the axis of the second level being at right angles to the axis of the first level and at right angles to the vertical bar, an arm mounted upon the end of the vertical bar spaced from the frame for positioning the same to and from a position projecting laterally from the vertical bar, the arm having a contact edge a distance equal to the spacing between two adjacent graduations on the horizontal bar from the contact edge at the remote end of the vertical bar when projecting laterally and in horizontal alignment therewith, means to retain the arm in projected position, means secured to the vertical bar having a contact edge half of a unit distance from the contact edge at the remote end of the vertical bar, pivot means carried by the frame adjacent to the horizontal bar and pivotally mounting the vertical bar upon the frame, and means to lock the vertical bar to the frame.

6. A device for measuring inclinations comprising a horizontal bar having a contact edge at one end thereof and an inner edge surface, equally spaced tenths graduations carried by the horizontal bar, ten such spaced graduations being a unit length, a frame slidably mounting the horizontal bar thereon, a dial member rotatably mounted on the frame, a rack carried by the horizontal bar on the inner edge surface and substantially the full length thereof, a rack gear carried by the dial member meshing with the rack for movement of the horizontal bar in the frame upon rotation of the dial member, the rack and rack gear moving the horizontal bar the distance between successive graduations on the horizontal bar for one revolution of the dial member, dial graduations of 100 equally spaced divisions circularly disposed on the dial member, a pointer carried by the frame adjacent to the dial divisions, a vertical bar carried at one end by the frame and extending at right angles to the horizontal bar, a contact edge at the remote end of the vertical bar from the frame, and the contact edge of the vertical bar being of unit length distance from a projection from the contact edge of the horizontal bar to a line in alignment with the edge of the vertical bar, pivot means carried by the frame adjacent to the horizontal bar and pivotally mounting the vertical bar upon the frame to swing the same into contact with or adjacent to the rack, and means to lock the vertical bar to the frame, and a first and a second level carried by the frame each having an axis, the axis of the first level being parallel with the horizontal bar, the axis of the second level being at right angles to the axis of the first level and at right angles to the vertical bar.

References Cited in the file of this patent

UNITED STATES PATENTS

| | | |
|---|---|---|
| 423,484 | Martin | Mar. 18, 1890 |
| 703,235 | Camden | June 24, 1902 |
| 1,136,427 | Lakhovsky | Apr. 20, 1915 |
| 1,145,694 | McKnight | July 6, 1915 |
| 1,580,813 | De Bus | Apr. 13, 1926 |
| 2,263,163 | Cornell | Nov. 18, 1941 |
| 2,711,025 | Natkie | June 21, 1955 |
| 2,746,164 | Eitzen | May 22, 1956 |

FOREIGN PATENTS

| | | |
|---|---|---|
| 4,963 | Great Britain | 1896 |
| 615,570 | Great Britain | Jan. 7, 1949 |